(12) United States Patent
Yoon et al.

(10) Patent No.: US 9,965,500 B2
(45) Date of Patent: May 8, 2018

(54) MIXED JOIN OF ROW AND COLUMN DATABASE TABLES IN NATIVE ORIENTATION

(75) Inventors: Yongsik Yoon, Seocho-ku (KR); Chanho Jeong, Seocho-ku (KR); Sang Kyun Cha, Seocho-ku (KR)

(73) Assignee: SAP SE, Walldorf (DE)

( * ) Notice: Subject to any disclaimer, the term of this patent is extended or adjusted under 35 U.S.C. 154(b) by 334 days.

(21) Appl. No.: 13/323,530

(22) Filed: Dec. 12, 2011

(65) Prior Publication Data

US 2013/0151502 A1    Jun. 13, 2013

(51) Int. Cl.
G06F 17/30    (2006.01)

(52) U.S. Cl.
CPC .. *G06F 17/30315* (2013.01); *G06F 17/30498* (2013.01)

(58) Field of Classification Search
CPC ......... G06F 17/30498; G06F 17/30315; G06F 17/30336
USPC ....................................................... 707/714
See application file for complete search history.

(56) References Cited

U.S. PATENT DOCUMENTS

| 5,987,453 | A | * | 11/1999 | Krishna et al. | |
|---|---|---|---|---|---|
| 6,263,331 | B1 | * | 7/2001 | Liu et al. | |
| 7,464,239 | B2 | * | 12/2008 | Hwang | G06F 11/2058 709/203 |
| 2006/0136388 | A1 | * | 6/2006 | Steinau et al. | 707/3 |
| 2011/0231389 | A1 | | 9/2011 | Surna | |
| 2011/0264667 | A1 | * | 10/2011 | Harizopoulos et al. | 707/743 |
| 2012/0173515 | A1 | | 7/2012 | Jeong et al. | |

OTHER PUBLICATIONS

Ramamurthy, DeWitt, and Su, A Case for Fractured Mirrors Proceedings of the 28th International Conference on Very Large Data Bases, 2002, pp. 430-441.*
Blakeley and Martin, Join Index, Materialized View, and Hybrid-Hash Join: A Performance Analysis Proceeding of the 6th International Conference on Data Engineering, 1990, pp. 256-263.*
Abadi, Madden, and Hachem, Column-stores vs. row-stores: how different are they really? Proceedings of the 2008 ACM SIGMOD International Conference on Management of data, 2008, pp. 967-980.*
Schaffner, Bog, Krüger, and Zeier, A Hybrid Row-Column OLTP Database Architecture for Operational Reporting Business Intelligence for the Real-Time Enterprise, Lecture Notes in Business Information Processing vol. 27, 2009, pp. 61-74.*

(Continued)

*Primary Examiner* — Kristopher Andersen
(74) *Attorney, Agent, or Firm* — Fountainhead Law Group P.C.

(57) ABSTRACT

A mixed join between database column and row tables employs an algorithm that recognizes both row and column store, and is executable upon the data in its native form (row or column) without requiring conversion between orientations. The native mixed join algorithm accesses the column dictionary of the column table for efficient join processing. The native mixed join algorithm may also exploit an inverted index (if present) to search a record (e.g. docid) with a given value. In particular, the native mixed join algorithm looks up a column dictionary for a join condition, while iterating the row table and returning matched records in a pipelined manner.

18 Claims, 15 Drawing Sheets

(56) References Cited

OTHER PUBLICATIONS

Garcia-Molina, Ullman, and Widom. Database Systems: The Complete Book, Second Edition. Pearson Education Inc., NJ, 2009. QA 76.9.D3 G3653 2009.*

David J. DeWitt, Jeffrey F. Naughton, and Joseph Burger, Nested Loops Revisted, In Proceedings of the Symposium on Parallel and Distributed Information Systems, 1993 [retrieved on Sep. 24, 2013]. Retrieved from the Internet: http://citeseerx.ist.psu.edu/viewdoc/summary?doi=10.1.1.49.3704.*

Daniel J. Abadi, "Query Execution in Column-Oriented Database System," Retrieved from the Internet: URL:http://cs-www.cs.yale.edu/homes/dna/papers/abadiphd.pdf Feb. 29, 2008.

Extended European Search Report (from a corresponding foreign application), EP 12007673.2, dated May 2, 2013.

* cited by examiner

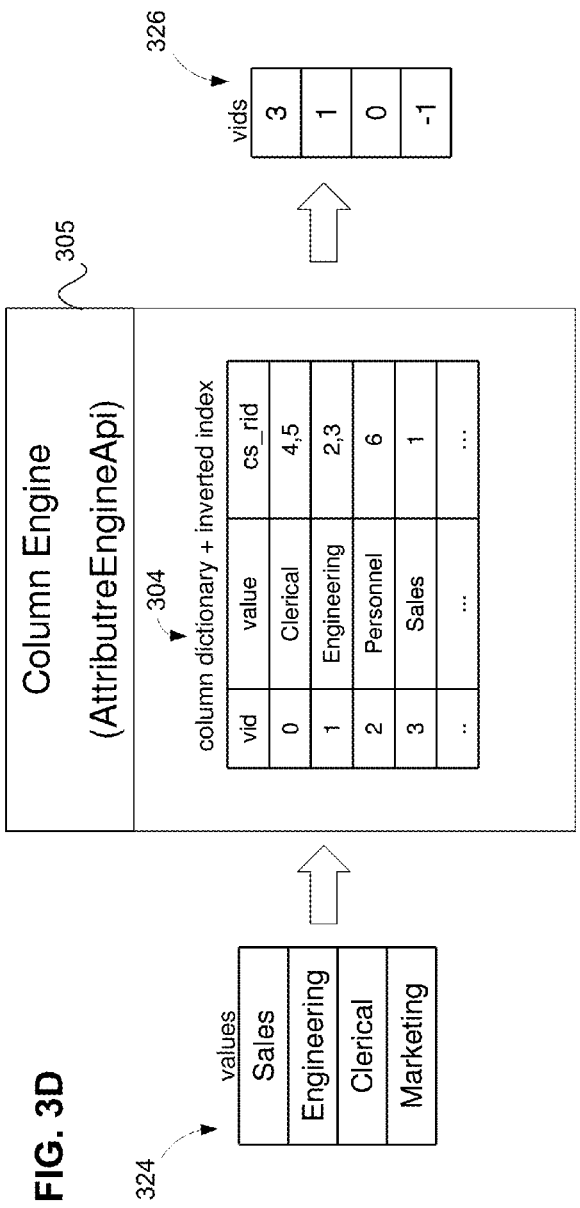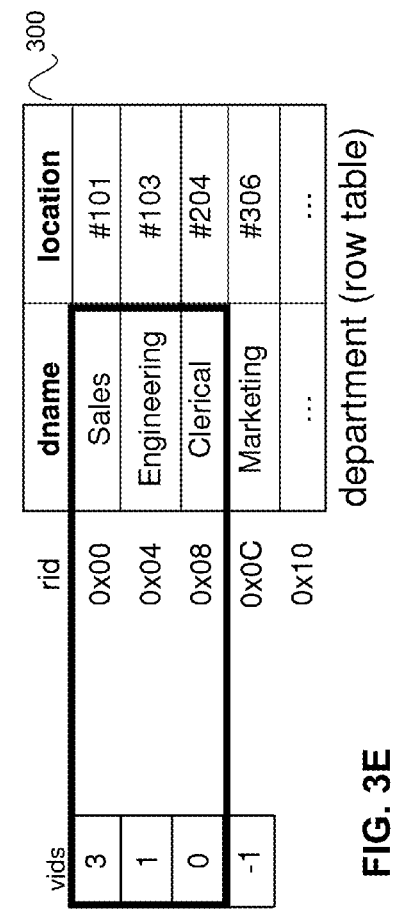
FIG. 3D
FIG. 3E

| cs_rids | vid |
|---|---|
| 1 | 1 |
| 2 | 2 |
| 3 | 2 |
| 4 | 1 |
| 5 | 3 |
| 6 | 4 |

FIG. 8

MIXED JOIN OF ROW AND COLUMN DATABASE TABLES IN NATIVE ORIENTATION

BACKGROUND

The present invention relates to storage of data in databases, and in particular, to processing a database query.

Unless otherwise indicated herein, the approaches described in this section are not prior art to the claims in this application and are not admitted to be prior art by inclusion in this section.

A database is an electronic filing system that stores data in a structured way. The primary storage structure in a database is a table. A database may contain multiple tables and each table may hold information of a specific type. Database tables store and organize data in horizontal rows and vertical columns. Rows typically correspond to real-world entities or relationships that represent individual records in a table. Columns may denote specific attributes of those entities or relationships, such as "name," "address" or "phone number." For example, Company X may have a database containing a "customer" table listing the names, addresses and phone numbers of its customers. Each row may represent a single customer and the columns may represent each customer's name, address and phone number.

Databases are generally stored in computer memory that is one-dimensional. Two-dimensional database tables must therefore be mapped onto a one-dimensional data structure to be stored within a database. One mapping approach involves storing a table in a database row-by-row (i.e., a row-oriented storage model). This approach keeps information about a single entity together. For example, row-by-row storage may store all information about a first customer first, then all information about a second customer and so on. Alternatively, a table may be stored in a database column-by-column (i.e., a column-oriented storage model). This approach keeps like attributes of different entities together. For example, column-by-column storage may store all customer names first, then all customer addresses and so on.

Data must generally be accessed from a table in the same manner that it was stored. That is, conventional computer storage techniques require dedicated query operators that can access specific types of storage models. For example, row query operators are used to process data stored in a database in row-formatted storage models and column query operators are used to process data stored in column-formatted storage models. Choosing which storage model to use thus often depends on how data will be used. Row-oriented storage models are commonly well-suited for transactional queries, while column-oriented storage models are generally well-suited for analytical queries. Accordingly, conventional query processing schemes are tightly bound to the underlying storage model of the database being queried.

In reality, however, a database having certain data stored in a column-formatted storage model may be asked to handle a transactional query relating to that data or a database having certain data stored in a row-formatted storage model may be asked to handle an analytical query relating to that data. For example, a database having data stored in a row-formatted storage model may receive a mixed set of queries requiring transactional and analytical processing of that data.

In responding to such a mixed set of queries, a query engine may seek to perform a mixed join operation. U.S. patent application Ser. No. 12/982,673 entitled "Processing Database Queries Using Format Conversion" was filed Dec. 30, 2010 and is hereby incorporated by reference in its entirety for all purposes. That patent application describes performing a mixed join indirectly in a conversion-based way. According to certain embodiments of this approach, row table data is converted into column format and then the join is performed in the column engine, or column table data is converted into row format and then the join is performed in the row engine.

However, conversion overhead for mixed join is usually not trivial from the perspective of performance and memory consumption. Therefore, it may not be desirable to use conversion-based mixed join queries in situations involving performance critical workload. Accordingly, the present disclosure addresses this and other issues with systems and methods for implementing a conversion-free native mixed join function.

SUMMARY

A mixed join between database column and row tables employs an algorithm that recognizes both row and column store, and is executable upon the data in its native form (row or column) without requiring conversion between orientations. The native mixed join algorithm accesses the column dictionary of the column table for efficient join processing. The native mixed join algorithm may also exploit an inverted index (if present) to search a record (e.g. docid) with a given value. In particular, the native mixed join algorithm looks up a column dictionary for a join condition, while iterating the row table and returning matched records in a pipelined manner.

An embodiment of a computer-implemented method comprises:

accessing in a non-transitory computer readable storage medium, a database created in an application level language and comprising a row store table and a column store table having a column dictionary;

iterating records in the row table;

causing a column engine to reference the column dictionary to obtain a join condition; and returning matched records to create a join table comprising data from the row store table and the column store table in a native state.

An embodiment of a non-transitory computer readable storage medium embodies a computer program for performing a method, said method comprising:

accessing in a non-transitory computer readable storage medium, a database created in an application level language and comprising a row store table and a column store table having a column dictionary;

iterating records in the row table;

causing a column engine to reference the column dictionary to obtain a join condition; and returning matched records to create a join table comprising data from the row store table and the column store table in a native state.

An embodiment of a computer system comprises:

one or more processors;

a software program, executable on said computer system, the software program configured to:

access in a non-transitory computer readable storage medium, a database created in an application level language and comprising a row store table and a column store table having a column dictionary;

iterate records in the row table;

cause a column engine to reference the column dictionary to obtain a join condition; and return matched records to create a join table comprising data from the row store table and the column store table in a native state.

Certain embodiments may further comprise referencing an inverted index of the column table to obtain the join condition.

According to some embodiments, referencing the column dictionary to obtain the join condition may comprise creating an intermediate structure.

In some embodiments the intermediate structure may comprise a mapping between a value from the column store table and a row identification from the row store table.

In some embodiments the join condition may comprise a foreign key join such that columns of the row table do not have duplicate values.

In some embodiments the join condition may comprise an N-to-M join, and further comprise maintaining a hash table for iterated values from the row table so as to avoid referencing the column dictionary for a same value.

The following detailed description and accompanying drawings provide a better understanding of the nature and advantages of the present invention.

BRIEF DESCRIPTION OF THE DRAWINGS

FIGS. 3B-3I are simplified schematic views of various steps of the native mixed join algorithm.

FIG. 8 shows a simplified physical representation of a column in a dictionary-encoded column table.

DETAILED DESCRIPTION

Described herein are techniques for performance optimization of a mixed join operation between column and row tables in a database.

According to an embodiment, a mixed join between database column and row tables employs an algorithm that is aware of both row and column store, and directly executable upon the data in its native form without requiring conversion between orientations. A column table has a column dictionary for each column. Optionally, the dictionary has an inverted index to search a record (docid) with given value. The native mixed join algorithm exploits the column dictionary and the inverted index for efficient join processing. In particular, the native mixed join algorithm looks up a column dictionary for a join condition, while iterating the row table and returning matched records in a pipelined manner.

Figure 1:
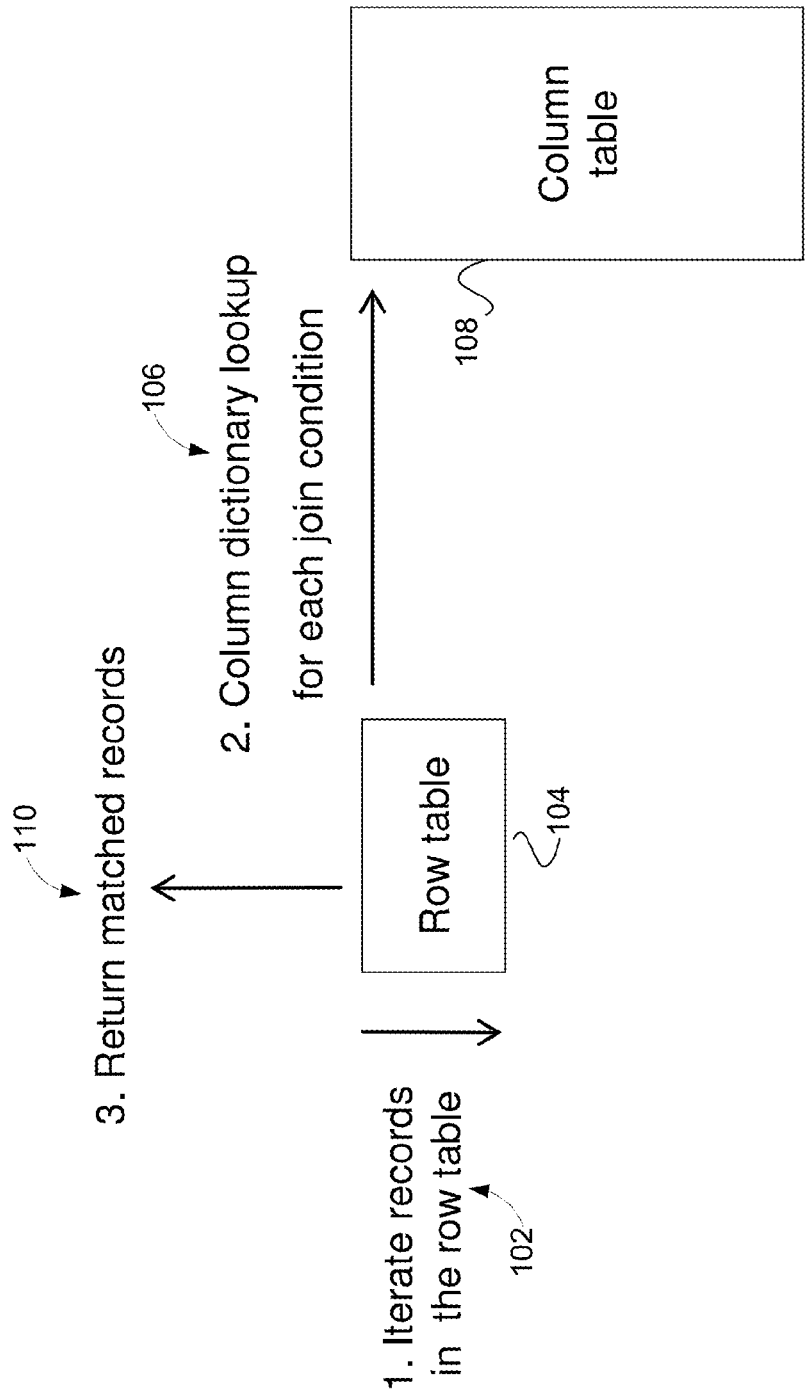
FIG. 1 shows a highly simplified schematic view of a mixed join according to an embodiment.

FIG. 1 shows a generic view of the functioning of a mixed join algorithm 100 according to an embodiment. In a first step 102, records are iterated in the row table 104. Second step 106 involves column dictionary lookup in the column table 108 for each join condition. In the third step 110, matched records are returned.

Figure 2:
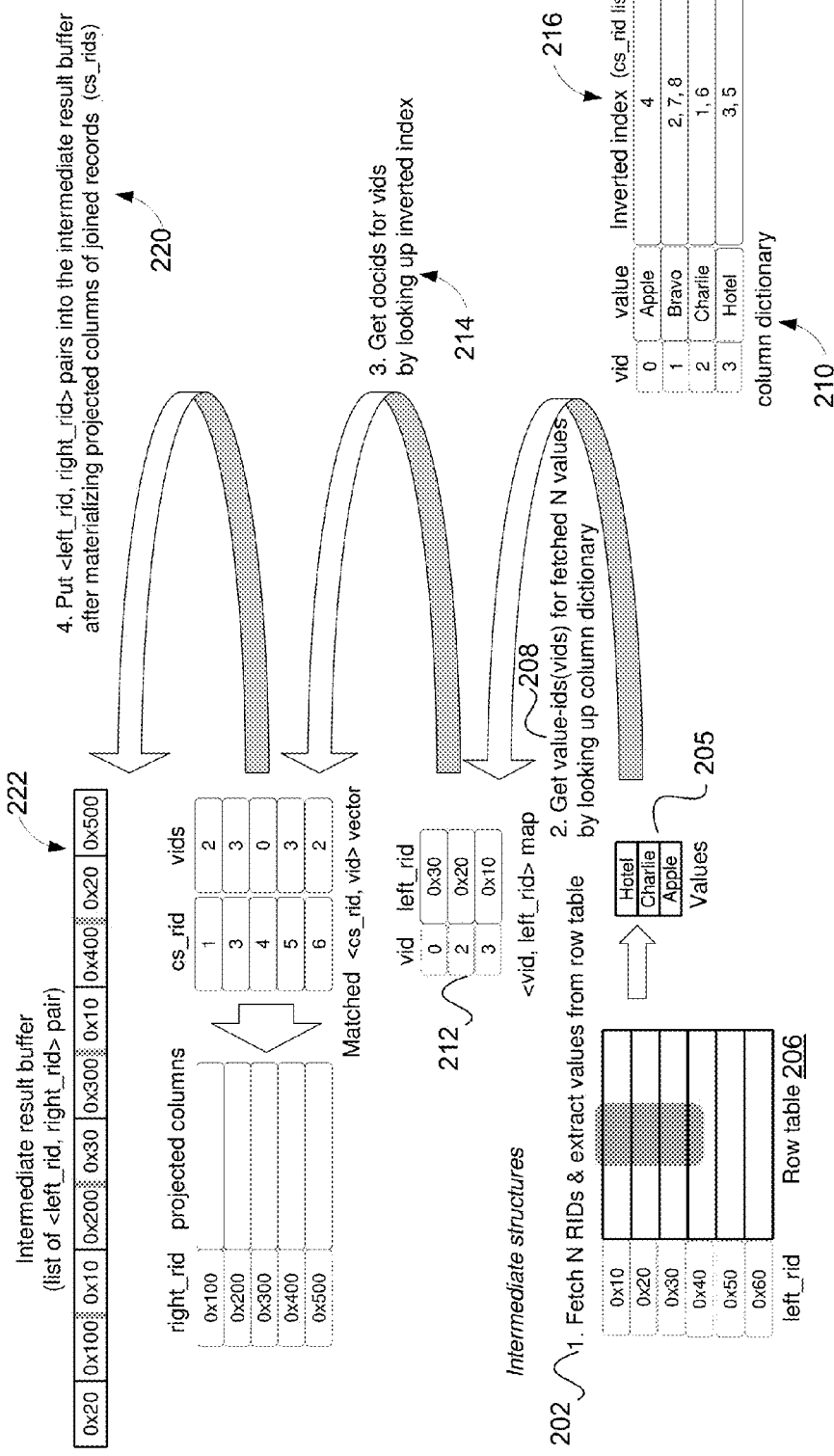
FIG. 2 shows a simplified schematic view of one embodiment of a foreign key mixed join.

FIG. 2 presents details of an embodiment mixed join in the context of a foreign key mixed join (1-to-N) algorithm, in the case where an inverted index is present and available. For foreign-key (FK) join, it can be assumed that join columns of a row table do not have duplicate value. Therefore, the column dictionary can be accessed for each value in fetched row table records.

According to a first step 202 of the FK mixed join algorithm 200, N records 205 are fetched from the row table 206. Here, the fetched records have values of Bravo, Charlie, and Apple.

In a second step 208, the column dictionary 210 is referenced to provide the value identifications (vids) for each fetched record of the join column. From this information, intermediate structures may be created for later use. For example, FIG. 2 shows a mapping 212 (<vid, rs_rid>) between the value id (vid, also value-id) of the column dictionary and the row id (rs_rid) from the row table.

In a third step 214, the docids of the column table are obtained from the value-ids by referencing the inverted index 216. From this, used-columns of matched column table records can be materialized. A reason for materializing used-columns of matched column table records, is to avoid retrieving values from the column dictionary for every column access in parent operators.

Finally, in the fourth step 220, the <rs_rid, cs_rid>pair is placed into the intermediate result buffer 222. The corresponding rs_rid with vid is found while scanning the matched docids. Used columns of joined records (docids), are materialized.

Figure 3:
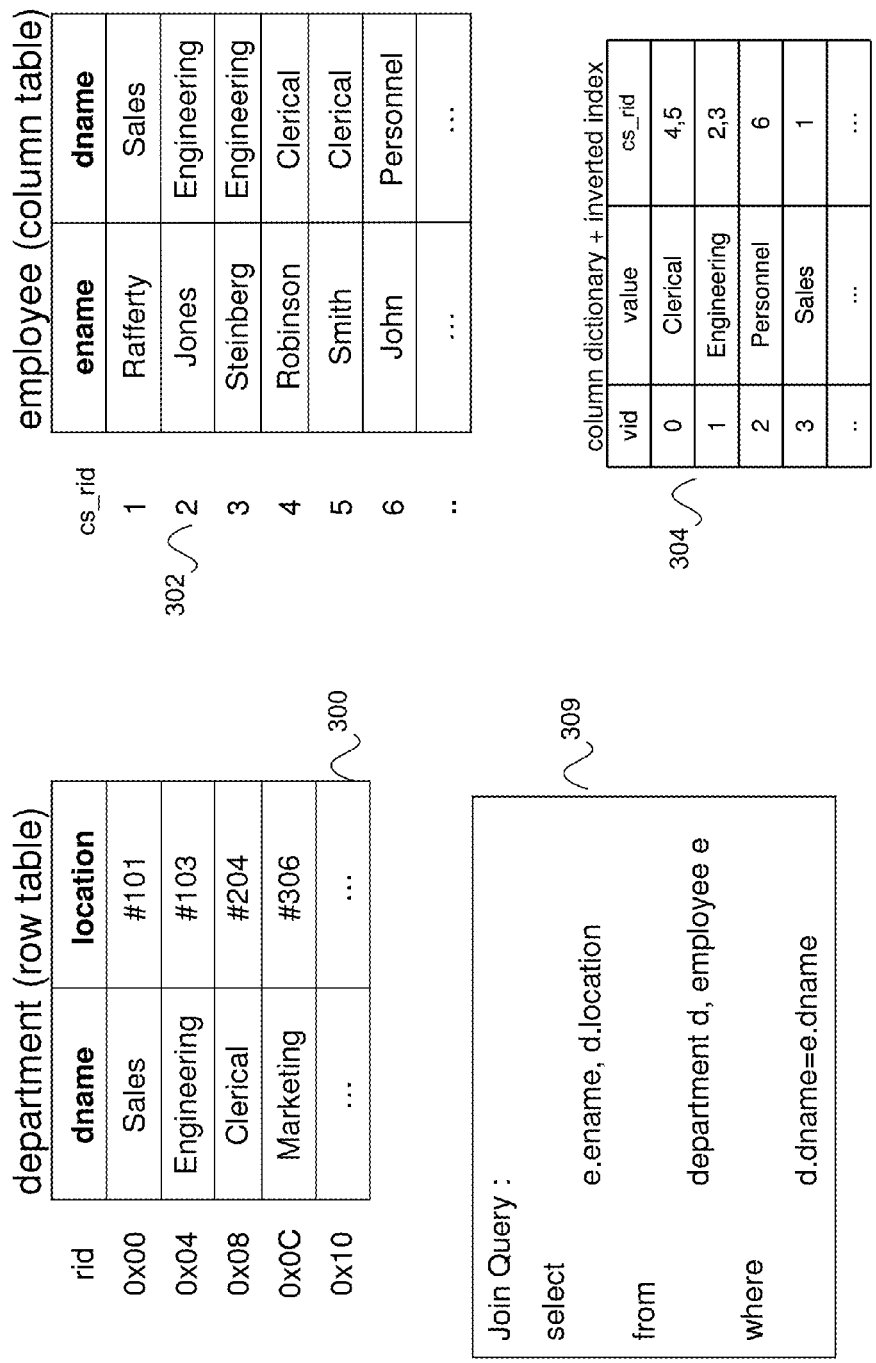
FIG. 3 shows a database to be queried according to an example.
Figure 3A:
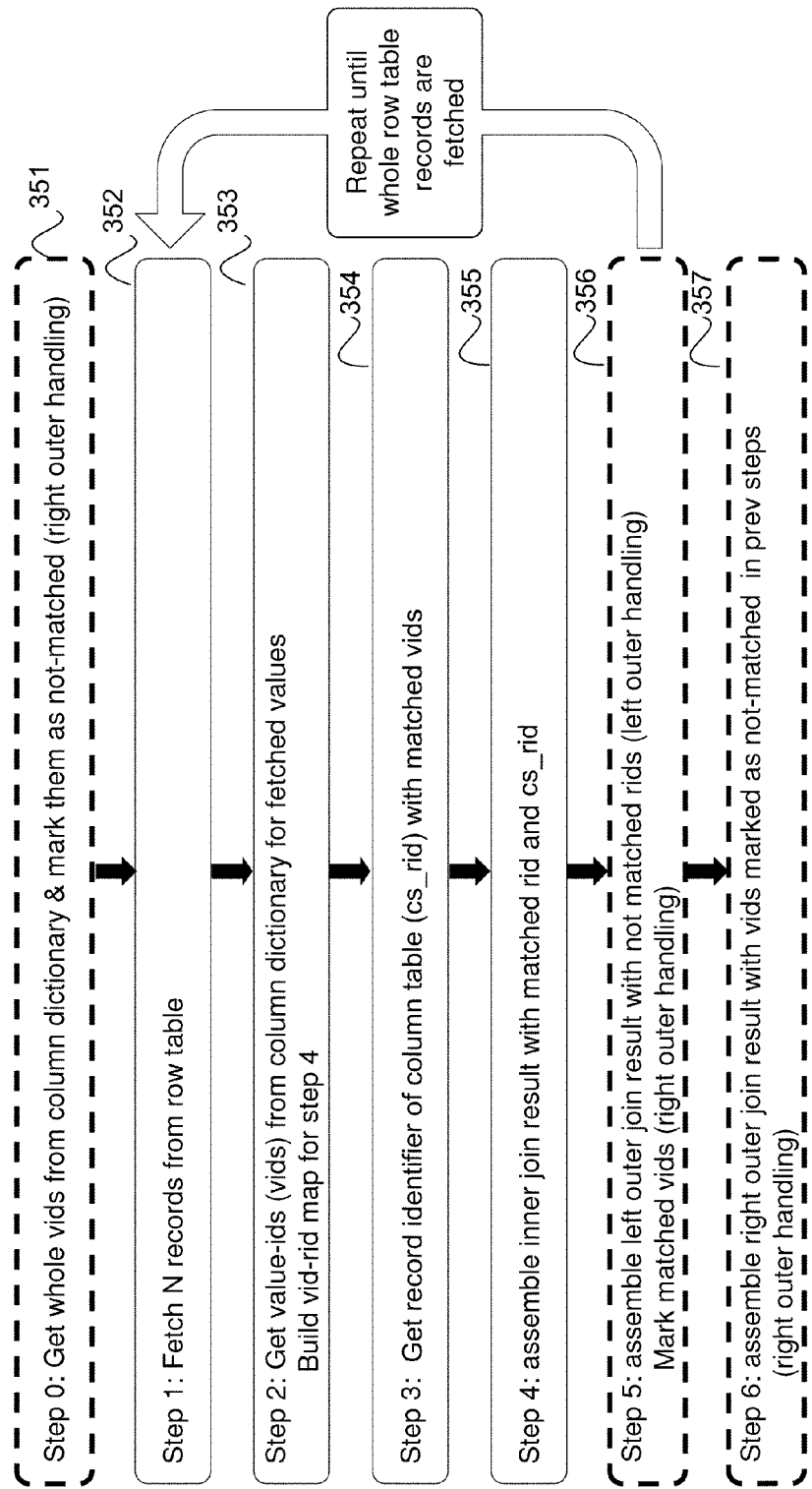
FIG. 3A is a flow diagram showing steps according to an embodiment of a mixed join algorithm.
Figure 3B:
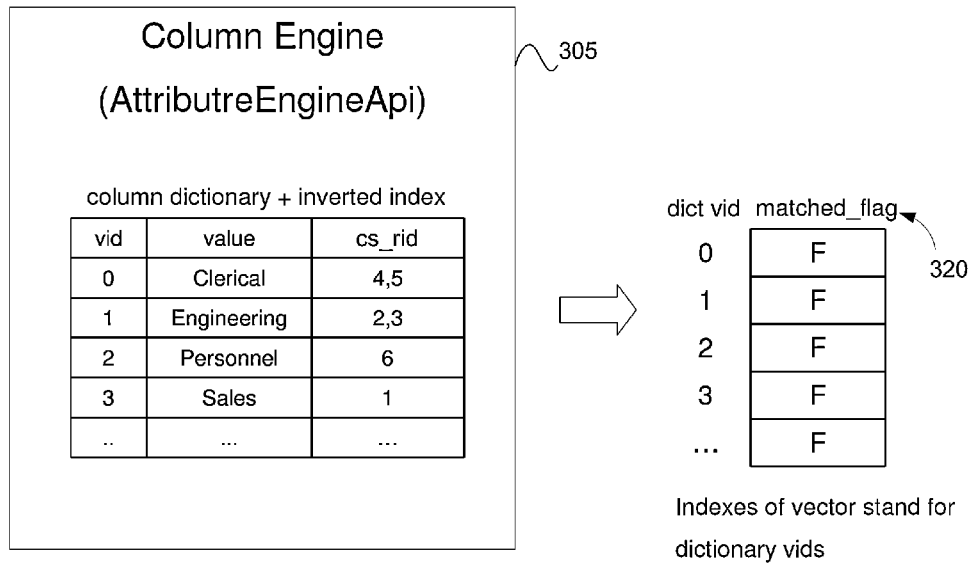
Figure 3C:
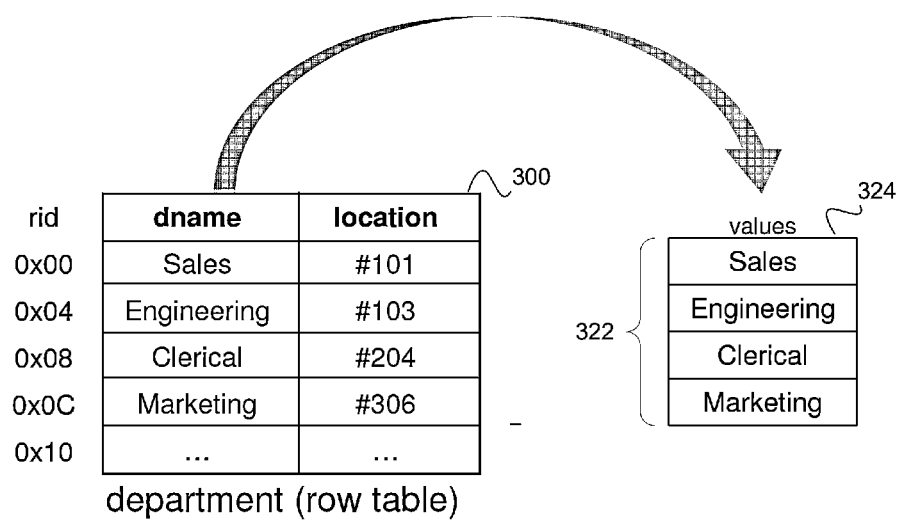
Figure 3F:
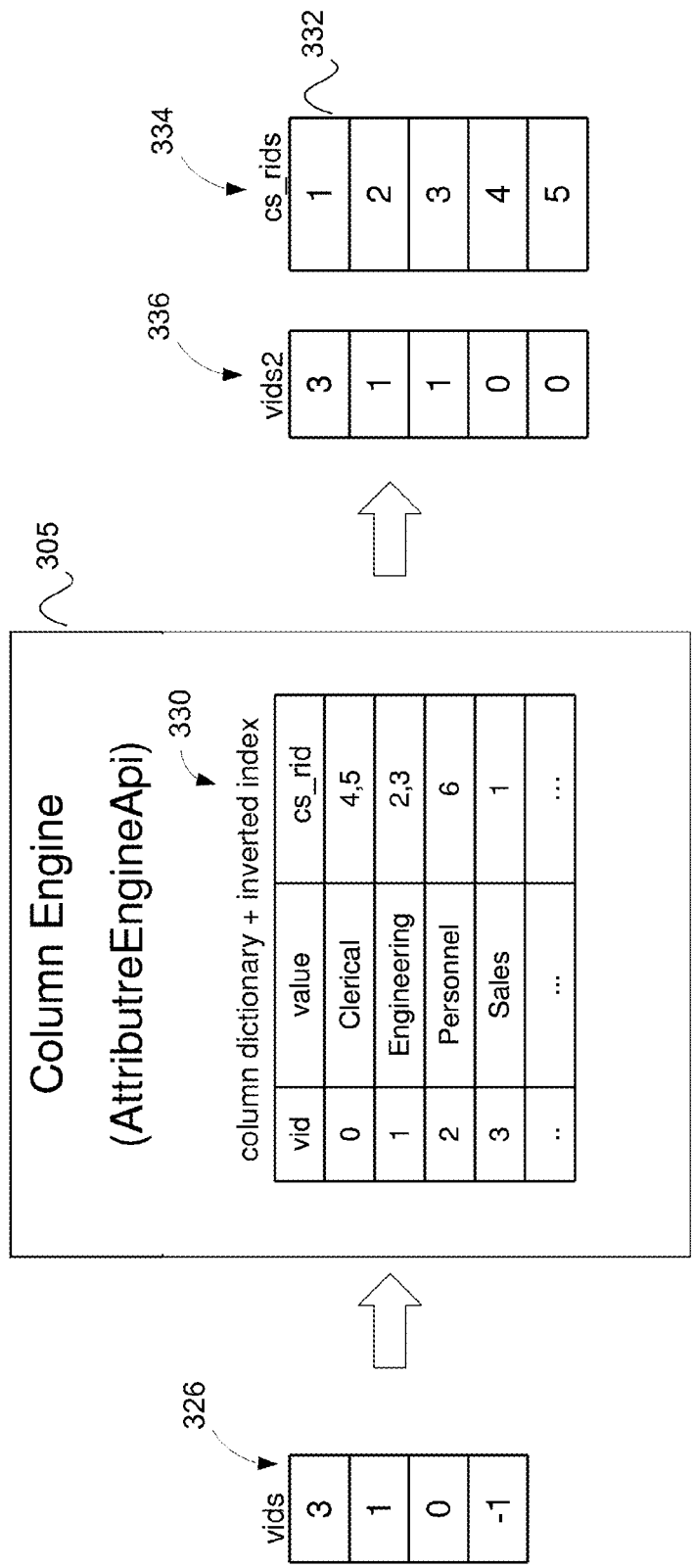
Figure 3G:
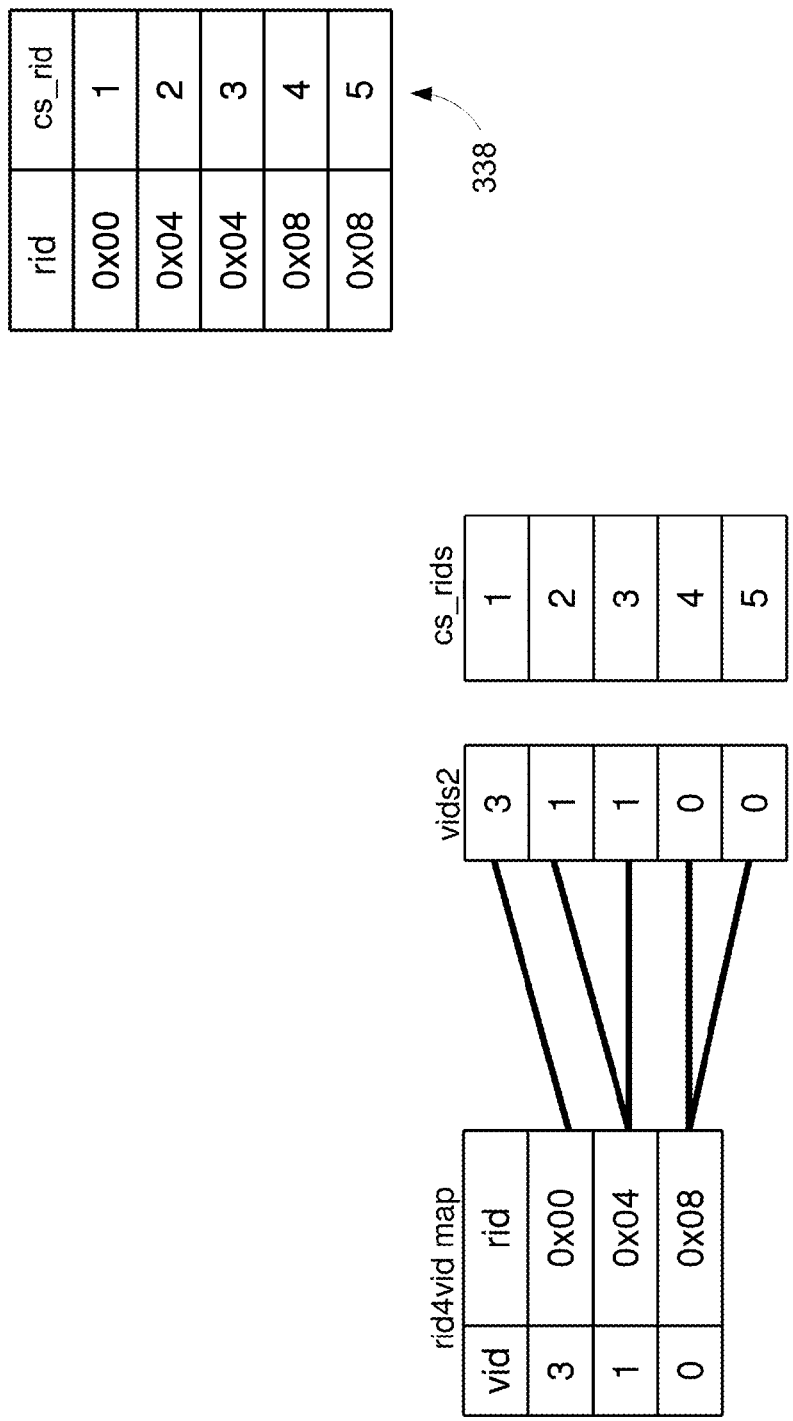
Figure 3H:
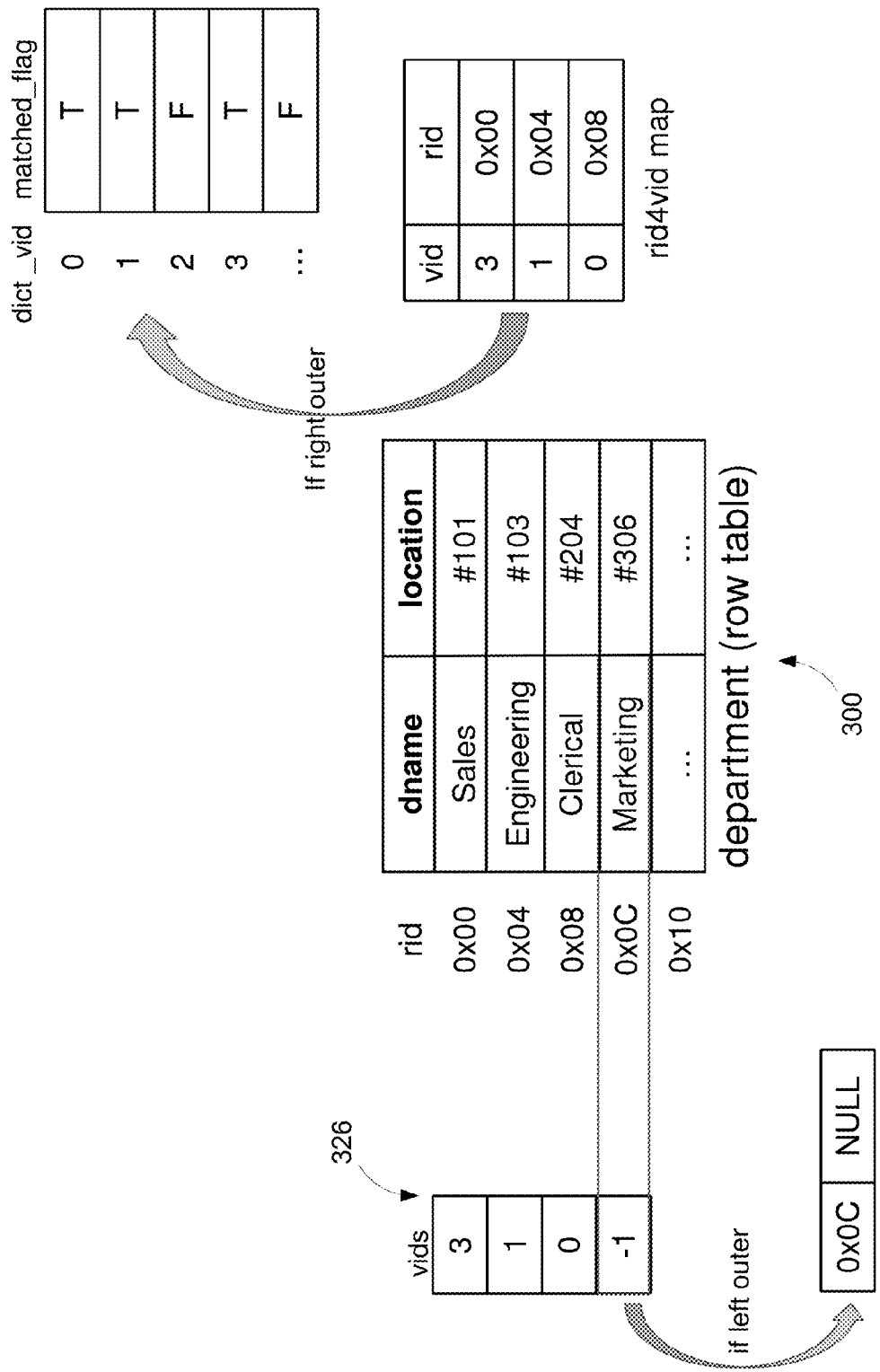
Figure 3I:
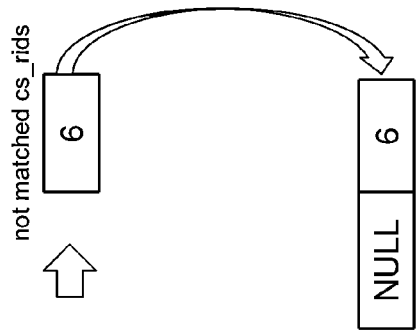

FIGS. 3-3I are simplified diagrams illustrating an example of the use of a mixed join operation in the specific context of a company directory. In particular, as shown in FIG. 3 information stored in the database comprises department names (dname), department locations (locations), and employee names (ename).

Department name and department location are stored as columns in a row store table 300. Each row of the row table is designated with a row identifier (rid).

Employee name (ename) and department (dname) are stored as columns in a column store table 302. Each row of the column table is designated with a document identifier (doc_id).

Also stored as part of the column table is a column dictionary 304. The column dictionary 304 includes mapping between distinct values of a column and value id (vid) for each distinct value.

The inverted index is an optional structure containing record identifiers (doc_id) for each value id (vid). The inverted index may be used to rapidly lookup the doc_ids corresponding to a given vid. In the event that an inverted index does not exist, the doc_ids can be retrieved by scanning a whole column and finding doc_ids matching to a given vid.

To the database just described, a query may be posed by a user requesting identification of the location of employees. To respond to this table requires joining the row store table with the column store table. In particular, a join query 309 of the following form may be used:

```
Select
        e.ename, d.location
From
        department d, employee e
Where
        d.dname = e.dname
```

FIG. 3A is a simplified chart listing the steps 351-357 of the process flow 350 involved in performing the mixed join for this query. In a preliminary step 351 shown in FIG. 3B, the value ids of the column dictionary 304 (dict_vids) are retrieved using the column engine 305. An output of this preliminary step is a matched_flag vector 320 whose indexes stand for dictionary vids.

An example of the first step 352 is shown in FIG. 3C. In this step, records 322 are fetched from the row table 300. A string values array 324 is then constructed with the fetched records.

In a next step 353 shown in FIG. 3D, the string values array 324 is input to the column engine 305, and the column dictionary is accessed to get the corresponding integer value_id (vid). The integer vids array 326 is output. Here, a vid of −1 indicates that there is no matching value in column dictionary In the next step 354 shown in FIG. 3E, an intermediate map structure is constructed. In particular, the vids array 326 is matched with a corresponding row_id (rid) from the row table. A map rid4vid 328 is built, that can find the rid based upon the vid input.

In the next step 355 shown in FIG. 3F, the corresponding doc_ids array is created. Specifically, the integer vids array 326 is input to the column engine 305 to search the inverted index 330 to obtain the integer document_id (doc_id) 332. The integer doc_ids array 334 and its corresponding vid array (vids2) 336 are output.

In the next step 356 shown in FIG. 3G, the inner join result is assembled. This involves scanning the vids2 array 334 having the corresponding doc_id. The rid4vid map 328 is accessed to find the rid. The rid is then matched with the doc_id to form the inner join result 338.

The next step 357 comprises outer join handling as shown in FIG. 3H. If the join is the left outer, then the vids array 326 is compared to the row table 300 to return the rid whose matching vid is −1 with null column value. If the join is the right outer, then the matching vids (not −1) is checked in the dict_vid-matched_flag vector.

In the final step 358 (shown in FIG. 3I), for a right outer join the vids is picked out from the dict_vids-matched_flag vector whose flag is false. Document ids' in an index without a matched vid, are searched with the column engine. doc_id's that are not matched, are returned with null row table value. In the particular embodiment illustrated in FIG. 3I, vid 2 is the not-matched-vid and doc_id 6 is found as not-matched-doc_id in column engine.

The result of a mixed join operator is an array comprising pairs of row_id (from row table) and doc_id (from column table). It is drawn as "Intermediate result buffer" in FIG. 2 and FIG. 4 (discussed below).

The pairs of row_id and doc_id are consumed by parent operators of the mixed join. With a row_id or doc_id (record identifier), a column value of a record (in row or column table) can be accessed by parent operators.

To summarize, embodiments of the native mixed join algorithm may directly access values of both row and column store data by iterating row store data and referencing the column dictionary. Embodiments of the native mixed join algorithm may allow join over row and column store data without any format conversion overhead. For each scanned value from row store data, the native mixed join can obtain the list of matched records (doc_ids) in column store data by: looking up column dictionary with the scanned value, getting a vid as the dictionary search result, and retrieving doc_ids from the inverted index or column engine with the found vid. Thus, the native mixed join can take place utilizing row and column store data in its native form, by directly accessing values from both row and column store and returning matching pairs of row_id and doc_id.

While the preceding example focused upon a foreign-key join (1-to-N join), other types of mixed join can be performed according to various embodiments. An example of another type of mixed join is the N-to-M join.

For an N-to-M join, there can be duplicate values in a row table. The execution steps of N-to-M mixed join are similar to a foreign key join, except for incremental hash table management. As an optimization, a hash table for fetched values from the row table may be maintained, so as to avoid looking up the column dictionary for the same value.

Figure 4:
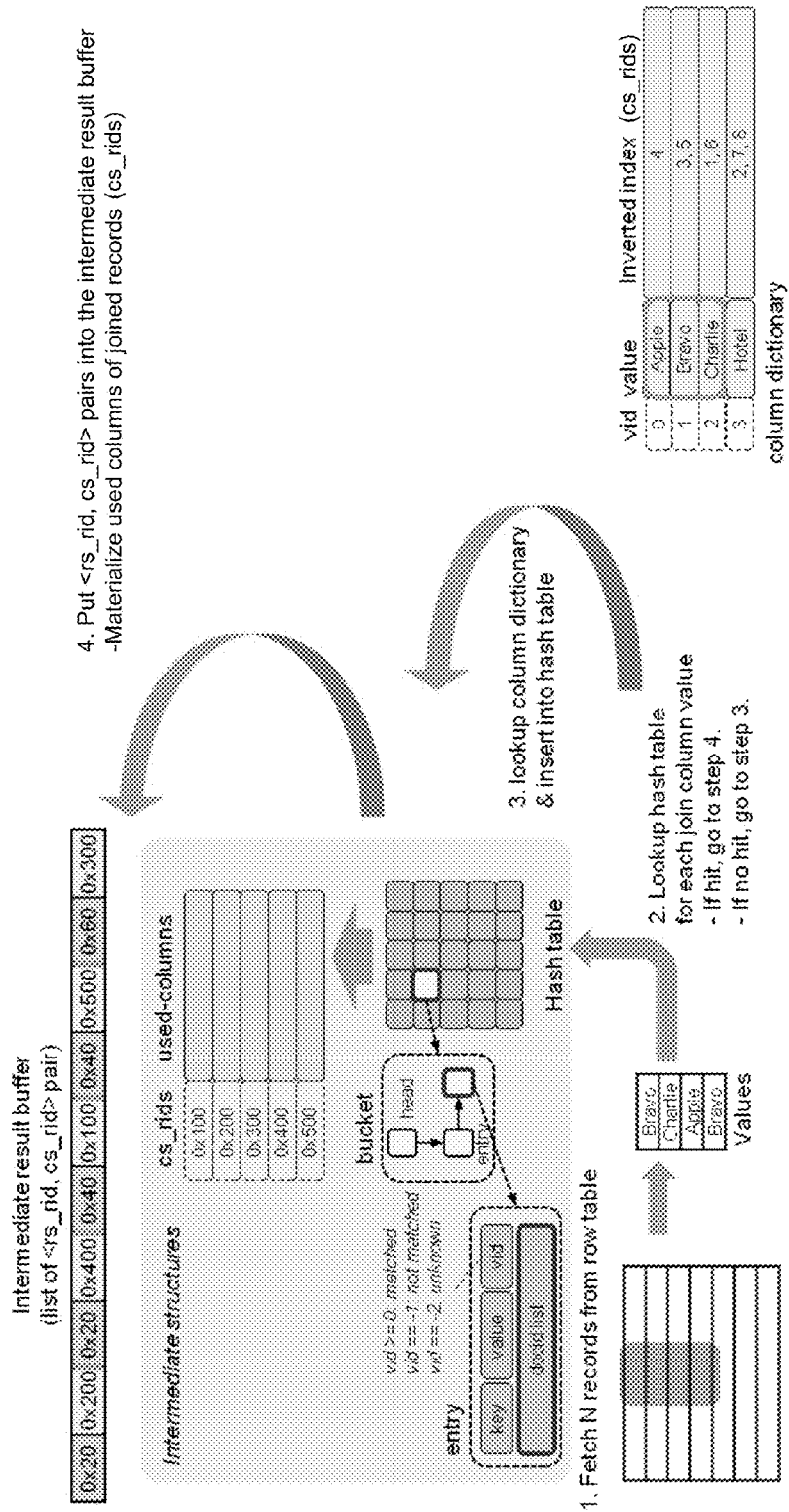
FIG. 4 shows a simplified schematic view of one embodiment of a foreign key N-to-M mixed join.

FIG. 4 shows an overview of an N-to-M mixed join algorithm according to an embodiment. A key of hash table is values from the row table, and an entry of hash table is <key, value, value-id from column dictionary, docids of column table>.

Again, in a first step 1. N records are fetched from a row table. Before looking up the column dictionary, in step 2. the hash table is consulted to check whether the value was already registered beforehand. If hash table entry is returned, then the join result (<rs_rid, cs_rid>pair list) is generated with an entry value.

If the value is not in the hash table yet, then the column dictionary is accessed in step 3. An entry is inserted into the hash table, and the result is returned.

In step 4, the <rs_rid, cs_rid>pair is placed into the intermediate result buffer 222. Used columns of joined records (docids), are materialized.

Embodiments of the new mixed join algorithm support pipelined execution so that steps 1~4 can be repeated, until the whole row data is consumed by the join algorithm. In pipelined execution, the join result is incrementally consumed by users, and there would be time gap among consecutive fetches.

The above description has focused upon embodiments wherein the inverted index is available to perform the mixed join. However, this is not required, and alternative embodiments could employ a mixed join in the absence of an inverted index.

Figure 8:
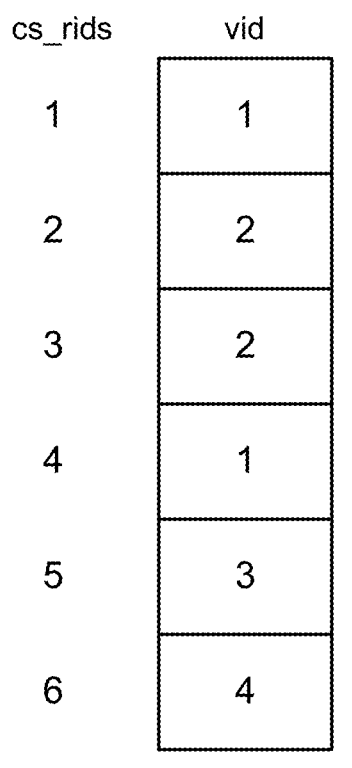

FIG. 8 shows a simplified physical representation of a column in a dictionary-encoded column table. A column is a vector of vids and doc_id is index of the array.

If an inverted index does not exist, then doc_ids can be retrieved by scanning the vid vector. For example, in this particular embodiment the doc_ids corresponding to vid 1 is {1, 4}. As scanning-based doc_id retrieval may in general be more expensive than inverted index access, the query optimizer may prefer to choose an algorithm utilizing an inverted index if one exists.

EXAMPLE

The performance of the conversion-free mixed join algorithm was evaluated by conducting an experiment for the TPC-H SF10 based dataset varying row table size. In this example, the inverted index was available to perform a foreign key mixed join algorithm.

In particular, the following query was posed to the dataset, allowing performance of join between the customer table and the orders table to be measured.

```
Select
        count(*)
From
        customer, orders
Where
        c_custkey = o_custkey
```

The orders table was a column store table, and its cardinality was 15M. The customer table was a row store table and its initial cardinality was 1.5M. The table cardinality ratio (row table cardinality/column table cardinality) was changed from 0.1 to 0.01 by changing row table cardinality.

Figure 5:
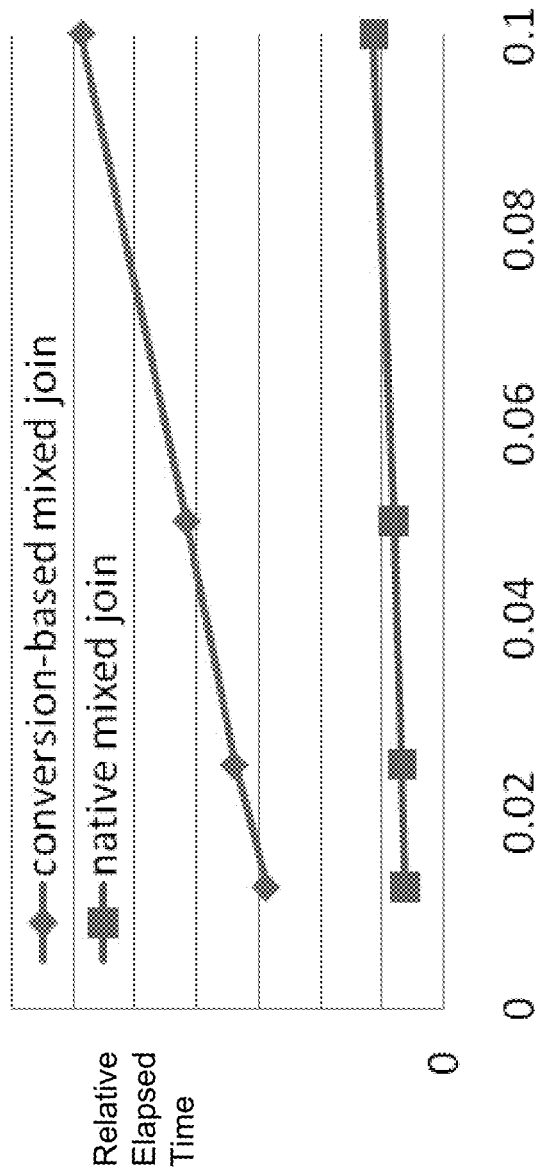
FIG. 5 plots relative elapsed time versus cardinality ratio, for both a native mixed join and a conversion-based mixed join.

FIG. 5 plots relative elapsed time versus table cardinality ratio. The graph plotted in FIG. 5 shows that the native mixed join outperforms existing conversion-based mixed join. In addition to offering this performance benefit, implementation of the native mixed join according to certain embodiments consumes less memory by allowing execution in a pipelined manner.

Figure 6:
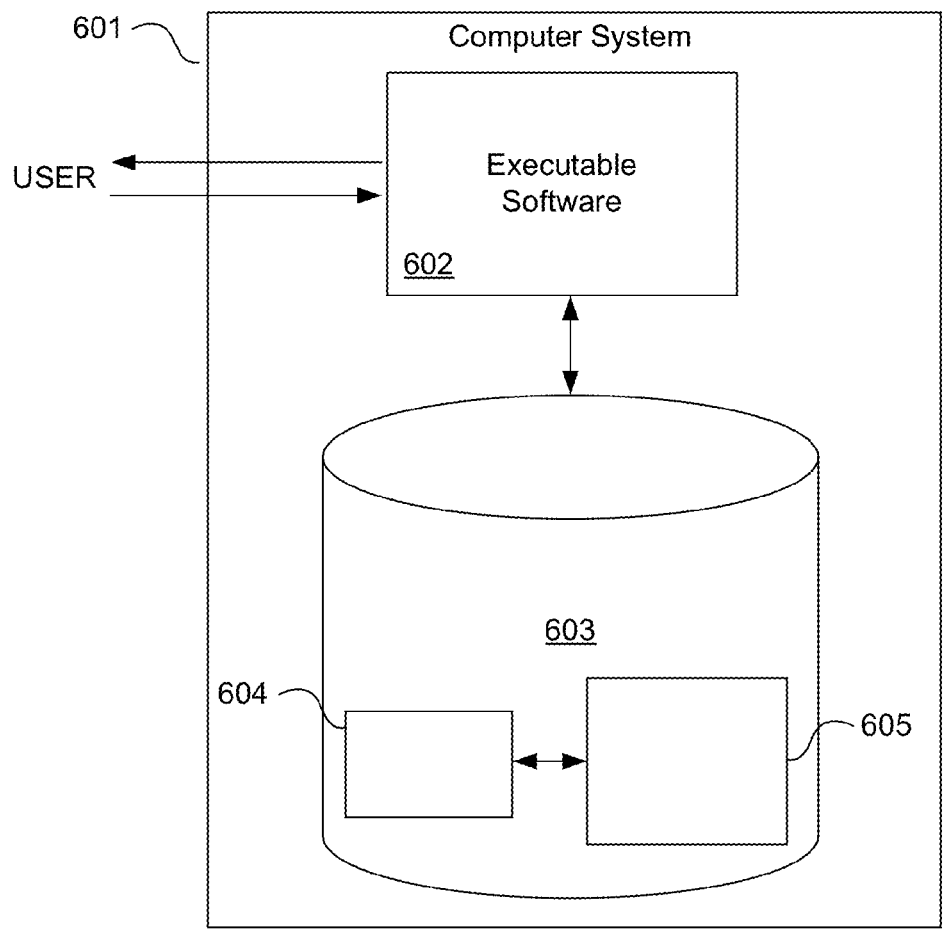
FIG. 6 illustrates hardware of a special purpose computing machine configured to implement a native mixed join according to an embodiment.

FIG. 6 illustrates hardware of a special purpose computing machine which may be configured to implement a native mixed join of database tables according to certain embodiments.

In particular, computer system 600 comprises a processor 602 that is in electronic communication with a non-transitory computer-readable storage medium 603. This computer-readable storage medium has stored thereon code 605 corresponding to the column engine. Code 604 corresponds to a column dictionary stored in a database of a non-transitory computer-readable storage medium, which may be referenced to perform the mixed join as has been described above.

The apparatuses, methods, and techniques described herein may be implemented as a computer program (software) executing on one or more computers. The computer program may further be stored on a non-transitory computer readable medium. The non-transitory computer readable medium may include instructions for performing the processes described.

In the following description, for purposes of explanation, examples and specific details are set forth in order to provide a thorough understanding of various embodiments. It will be evident, however, to one skilled in the art that the present invention as defined by the claims may include some or all of the features in these examples alone or in combination with other features described below, and may further include modifications and equivalents of the features and concepts described herein.

The computer system may comprise a software server. A number of software servers together may form a cluster, or logical network of computer systems programmed with software programs that communicate with each other and work together to process requests.

Figure 7:
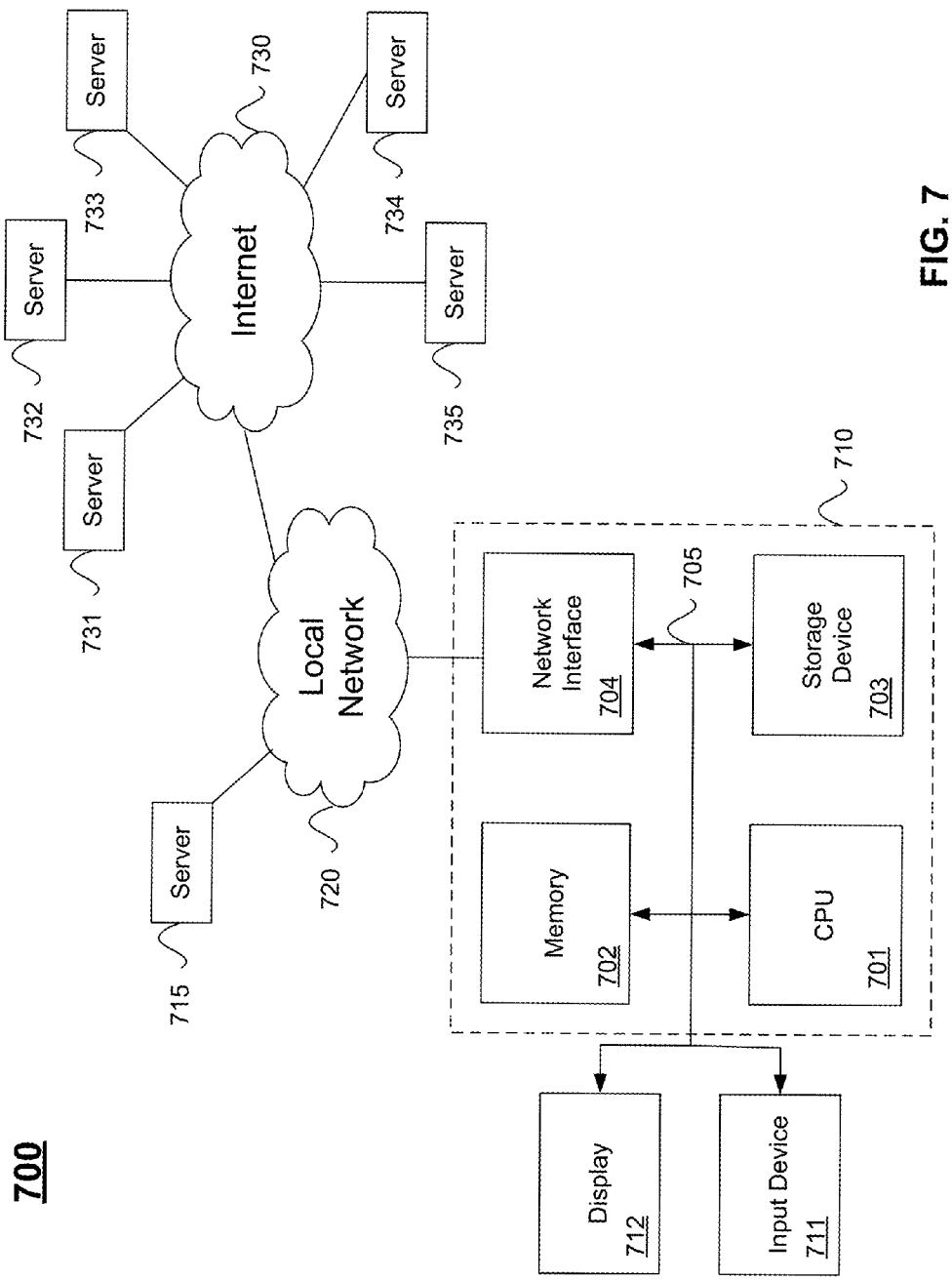
FIG. 7 shows an example of a computer system.

An example computer system 710 is illustrated in FIG. 7. Computer system 710 includes a bus 705 or other communication mechanism for communicating information, and a processor 701 coupled with bus 705 for processing information.

Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both.

A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read.

Storage device 703 may include source code, binary code, or software files for performing the techniques above, for example. Storage device and memory are both examples of computer readable media.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein.

In an example involving the Internet, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   accessing in a non-transitory computer readable storage medium, a database created in an application level language and comprising a row store table and a column store table having a column dictionary;
   retrieving one or more records from the row store table;
   generating a value array from data in the records retrieved from the row store table;
   using the value array, accessing a plurality of value ids from the column dictionary of the column store table that correspond to values in the value array;
   using the value ids and the row store table, generating a vid-rid table comprising a column that contains the value ids from the column store table and a column that contains row ids of rows in the row store table that contain the values corresponding to the values ids;
   using the value ids, generating a doc id array of doc ids of records in the column store table that contain the value ids; and
   performing at least an inner join operation using the doc id array and row ids in the vid-rid table to produce a plurality of row id and doc id pairs.

2. The computer-implemented method of claim 1 further comprising referencing an inverted index of the column store table to obtain the join condition.

3. The computer-implemented method of claim 1 wherein the join condition comprises a foreign key join such that columns of the row store table do not have duplicate values.

4. The computer-implemented method of claim 1 wherein the join condition comprises N-to-M join, the method further comprising maintaining a hash table for iterated values from the row store table so as to avoid referencing the column dictionary for a same value.

5. The computer-implemented method of claim 1 wherein retrieving data from the column dictionary includes generating a join condition using data from the row store table and data from the column store table.

6. The computer-implemented method of claim 5 wherein generating a join condition includes creating a mapping between one or more row identifiers from the data from the row store table and data from the column store table.

7. The computer-implemented method of claim 1 wherein more than one record is retrieved from the row store table.

8. The computer-implemented method of claim 1, wherein the method is performed in pipeline fashion.

9. A non-transitory computer readable storage medium embodying a computer program for performing a method, said method comprising:
   accessing in a non-transitory computer readable storage medium, a database created in an application level language and comprising a row store table and a column store table having a column dictionary;
   retrieving one or more records from the row store table;
   generating a value array from data in the records retrieved from the row store table;
   using the value array, accessing a plurality of value ids from the column dictionary of the column store table that correspond to values in the value array;
   using the value ids and the row store table, generating a vid-rid table comprising a column that contains the value ids from the column store table and a column that contains row ids of rows in the row store table that contain the values corresponding to the values ids;
   using the value ids, generating a doc id array of doc ids of records in the column store table that contain the value ids; and
   performing at least an inner join operation using the doc id array and row ids in the vid-rid table to produce a plurality of row id and doc id pairs.

10. The non-transitory computer readable storage medium of claim 9 further comprising code to reference an inverted index of the column store table to obtain the join condition.

11. The non-transitory computer readable storage medium of claim 9 wherein the join condition comprises a foreign key join such that columns of the row store table do not have duplicate values.

12. The non-transitory computer readable storage medium of claim 9 wherein the join condition comprises N-to-M join, the non-transitory computer readable storage medium further comprising code maintaining a hash table for iterated values from the row store table so as to avoid referencing the column dictionary for a same value.

13. The non-transitory computer readable storage medium of claim 9, wherein the method is performed in pipeline fashion.

14. A computer system comprising:
   one or more processors;
   a software program, executable on said computer system, the software program configured to:
   access in a non-transitory computer readable storage medium, a database created in an application level language and comprising a row store table and a column store table having a column dictionary;
   retrieve one or more records from the row store table;
   generate a value array from data in the records retrieved from the row store table;
   use the value array to access a plurality of value ids from the column dictionary of the column store table that correspond to values in the value array;
   use the value ids and the row store table to generate a vid-rid table comprising a column that contains the value ids from the column store table and a column that contains row ids of rows in the row store table that contain the values corresponding to the values ids;
   use the value ids to generate a doc id array of doc ids of records in the column store table that contain the value ids; and
   perform at least an inner join operation using the doc id array and row ids in the vid-rid table to produce a plurality of row id and doc id pairs.

15. The computer system of claim 14 wherein the software code is configured to reference an inverted index of the column store table to obtain the join condition.

16. The computer system of claim 14 wherein the join condition comprises a foreign key join such that columns of the row store table do not have duplicate values.

17. The computer system of claim 14 wherein the join condition comprises an N-to-M join, the non-transitory computer readable storage medium further comprising code maintaining a hash table for iterated values from the row store table so as to avoid referencing the column dictionary for a same value.

18. The computer system of claim 14, wherein the software program is configured to execute in pipeline fashion.

* * * * *